INVENTOR.
Paul Kollsman
BY Howard G. Russell
his ATTORNEY

Jan. 29, 1963   P. KOLLSMAN   3,075,908
METHOD OF TREATING LIQUIDS BY ELECTRODIALYSIS
AT ELEVATED TEMPERATURES
Filed April 23, 1958   4 Sheets-Sheet 2

INVENTOR.
Paul Kollsman
BY Howard G. Russell
his ATTORNEY

INVENTOR.
Paul Kollsman

INVENTOR.
Paul Kollsman
BY Howard G. Russell
his ATTORNEY

United States Patent Office 3,075,908
Patented Jan. 29, 1963

3,075,908
METHOD OF TREATING LIQUIDS BY ELECTRO-
DIALYSIS AT ELEVATED TEMPERATURES
Paul Kollsman, 100 E. 50th St., New York, N.Y.
Filed Apr. 23, 1958, Ser. No. 730,320
6 Claims. (Cl. 204—180)

This invention relates to improvements in methods of treating liquids by electrodialysis. Such methods include the concentration and dilution of ionic solutions by transfer to ions from one fluid volume into another through a barrier between the said volumes. Apparatus for carrying out such methods generally comprise a series of alternatingly arranged concentration and dilution compartments defined by bordering semi-permeable barriers of two kinds, arranged in alternating sequence, so that a barrier permeable to ions of one sign and passage resistant to ions of the opposite sign is followed by a barrier permeable to ions of the opposite sign, and so forth.

A prominent field for methods and apparatus of the aforesaid character is the desalting of naturally occurring saline waters, such as brackish water or sea water.

Other methods within the purview of this invention involve the separation of ionic constituents of liquids into distinct fractions either with or without the aid of gravity. Generally such methods involve the accumulation of certain ions in layers or strata. Ions collecting in horizontal strata may be withdrawn through vertically spaced withdrawal ducts. Vertical strata forming along membrane surfaces may be withdrawn after collection by gravity in which case the heavier components move towards the lowest portion, or by centrifugal acceleration in which case the heavier components move towards the portion of largest radius.

Other methods of separation are based on the different transport mobility of different fractions. It is therefore possible to separate ions of the same polarity by causing them to travel through a permselective membrane towards an electrode. A product containing a relatively high percentage of ions of a higher mobility can be withdrawn at the far side of the membrane and a product containing a relatively high percentage of ions of a lower mobility can be withdrawn at the near side of the membrane.

In the practice of electrodialytic methods of the aforementioned nature, energy losses are incurred arising from the electrical resistance of the apparatus. The energy losses are attributable to the electrical resistivity of the ionic liquids under treatment and to the electrical resistivity of the ion exchange materials in the apparatus.

It has been proposed to reduce energy losses caused by the resistance of the electroylte by raising the temperature of the electrolyte to a higher level. For this purpose it has been proposed to equip an electrodialyzer containing parchment paper membrances with steam jackets to raise the temperature of the liquid.

In the field of electrolysis it is known to preheat the liquor before it enters the cell in order to insure satisfactory operation. According to known practice the heat expended for the preheating of the liquor and a certain amount of heat developed during the process itself is recovered from the outflowing liquor and reused for preheating raw liquor. In the known process and apparatus no ion exchange materials are involved.

The present invention, in distinction, deals with electrodialysis in the presence of ion exchange material in the pores of which a higher ionic concentration exists than in the ionic liquid flowing through, or past, the material.

According to the invention the ion exchange material in an electrodialysis apparatus is maintained in a state of controlled reduced electrical conductivity by controlling the cooling effect upon the ion exchange material of the liquid which flows past it. More particularly, the ion exchange material is cooled to a limited extent, so that under the flow of the electric current to which the material is subjected its temperature is maintained sufficiently high to result in a substantial reduction of its electrical resistivity, but not so high that the resistivity of the apparatus is increased by boiling of the liquid or formation of vapor within the ion exchange material.

The control is carried out in such a way that the volume and the rate of flow of the liquid may be chosen at will and are not depended on for control purposes, the main control signals being temperature signals derived from selected points of the liquid flow.

The operating temperatures are not necessarily the same throughout the entire apparatus or installation, but it may be advantageous, particularly in multistage operation, to offset increased resistivity of the liquid, incidental to deionization, by decreased resistivity of the ion exchange materials within the portion of the apparatus through which the deionized liquid flows.

The various objects, features and advantages of this invention will appear more fully from the detailed description which follows, accompanied by drawings, showing for the purpose of illustration forms of apparatus for practicing the invention. The invention also resides in certain steps and sequences of steps as well as certain new and original features of construction and combination of elements hereinafter set forth and claimed.

Although the characteristic features of the invention which are believed to be novel will be particularly pointed out in the claims appended hereto, the invention itself, its objects and adavantages and the manner in which it may be carried out may be better understood by referring to the following description taken in connection with accompanying drawings forming a part of it, in which:

Figure 1:
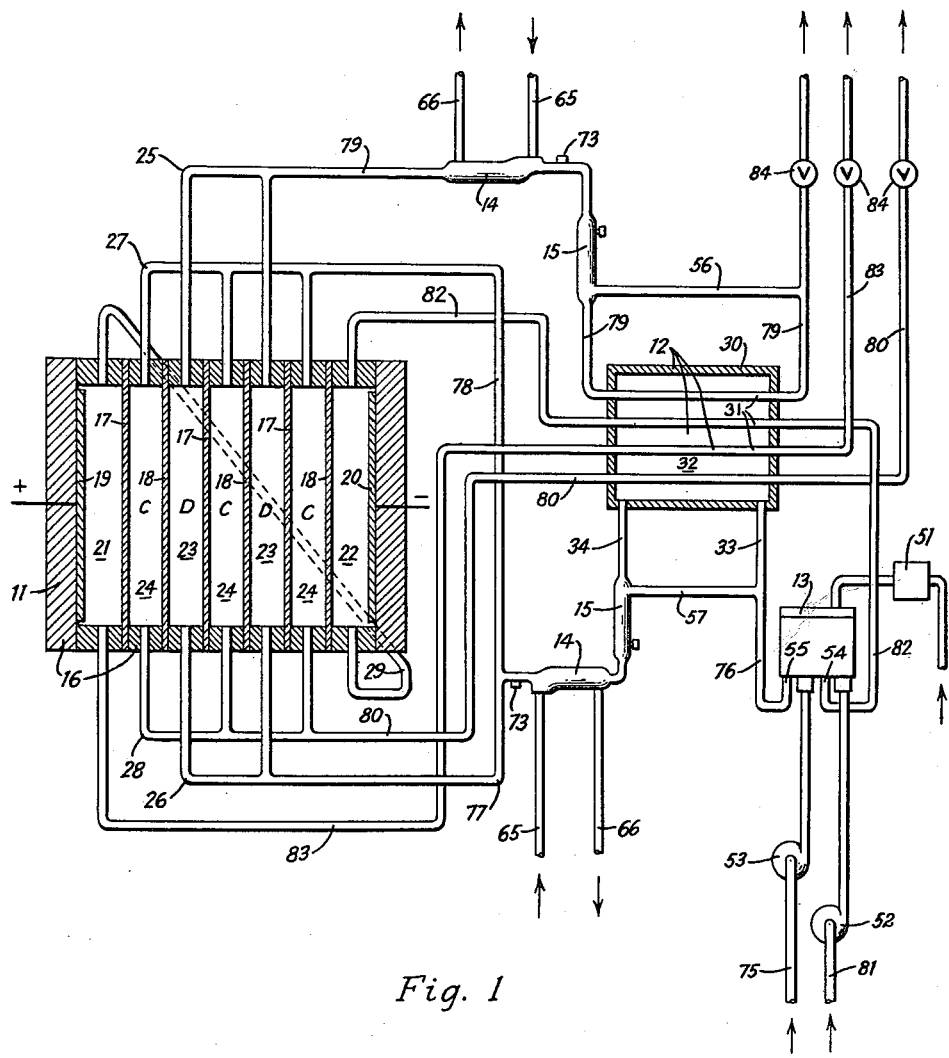
FIGURE 1 is a diagrammatic representation of a representative form of apparatus for practicing the invention.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of the invention for the purpose of explanation of broader aspects of the invention, but it is understood that the details may be modified in various respects without departure from the principles of the invention and that the invention may be practiced by other devices than the ones shown.

The apparatus shown in FIGURE 1 comprises basically an electrodialysis unit 11, a heat exchanger 12, a pressure control unit 13, temperature control units 14 and 15 and connecting ducts as well as pumps and valves later to be described in greater detail.

The electrodialysis unit 11 comprises a housing 16 subdivided into a plurality of treatment chambers by an appropriate number of permselective membranes. Membranes 17 are cation membranes and membranes 18 are anion membranes. The cation membranes and the anion membranes are arranged in alternating sequence. Electrodes 19 and 20 are arranged in the terminal compartments 21 and 22, the electrode 19 being an anode and the electrode 20 being a cathode. This arrangement makes the chambers 23 deionization chambers, whereas the chambers 24 become concentration chambers.

Ducts are provided for passing liquid through the several chambers, the ducts of the deionization chambers being manifolded at 25 and 26 and the ducts of the concentration chambers being manifolded at 27 and 28. A connecting duct 29 provides for passage of an electrolyte from one electrode chamber into the other.

The membranes may be constructed according to known techniques from a great number of commercially available ion exchange materials. Suitable membranes may, for example, be produced according to the Wyllie and Patnode technique disclosed in the Journal of Physical and Colloid Chemistry, vol. 54, representative data being as follows:

In constructing apparatus for practicing the invention Amberlite IR-120 was used in the manufacture of the cation membranes and Amberlite IRA-400 was used in the manufacture of the anion membranes. The Amberlite was used in air dried condition, as disclosed by Wyllie, and was of a mean particle size of about 0.1 mm. diameter.

Polyethylene of a mean particle size of 0.05 mm. was used as a binder, and 28% binder, by weight, was combined with 72% of ion exchange resin. The mixture was placed in a mold, pressure of about 500 pounds per square inch was applied and then the temperature was increased to a maximum of 150° C. When 140° C. was reached, the pressure was increased to 2500 p.p.s.i. and maintained one minute after the temperature of 150° C. was reached, a total time of about five minutes. After molding the membrane surfaces were ground with an abrasive to remove any possible surface film of binder material.

In order to render the membranes more heat resistant, the membranes may be exposed to X-rays with a dosage of one to thirty million roentgens or to equivalent radiation of nuclear reaction. The radiation produces crosslinking which makes the irradiated polyethylene substantially infusible. Tests conducted with irradiated polyethylene show that at temperatures up to 250° F. irradiated polyethylene is stronger and stiffer than conventional polyethylene and that irradiated polyethylene retains form stability at temperatures as high as 300° F.

Tests were conducted to establish the magnitude of changes in electrical resistivity of the membranes as a function of membrane temperature. The results of these tests are given further below and establish that the ion exchange material behaves similar to a liquid rather than a solid with regard to changes in electrical resistivity when subjected to changes in temperature.

Further tests were conducted to determine the changes in electrical resistivity of electrolyte in response to changes in temperature and to compare the results with the corresponding figures of ion exchange material, leading to the conclusion that the benefits derived from an increase in operating temperature are much greater in membranes or fillers of ion exchange material than in ionic liquid.

It was further found that passage of a certain electric current through ionic liquid and ion exchange material produces higher temperatures locally in the ionic exchange material than in the liquid. This makes it possible to use the liquid for the purpose of controlled cooling of elements composed of ion exchange material past which the liquid flows. Test results showing the comparative change in electrical resistivity of ion exchange material and ionic liquid are given further below.

The inflow and outflow ducts of the electrodialyzer pass through the heat exchanger 12 which, essentially, comprises an outer shell 30 enclosing a plurality of individual ducts 31 preferably of stainless steel tubing. The ducts 31 are in heat exchanging relationship with the liquid within the chamber 32 formed by the shell. The chamber has an inlet at 33 and an outlet at 34.

Figure 4:
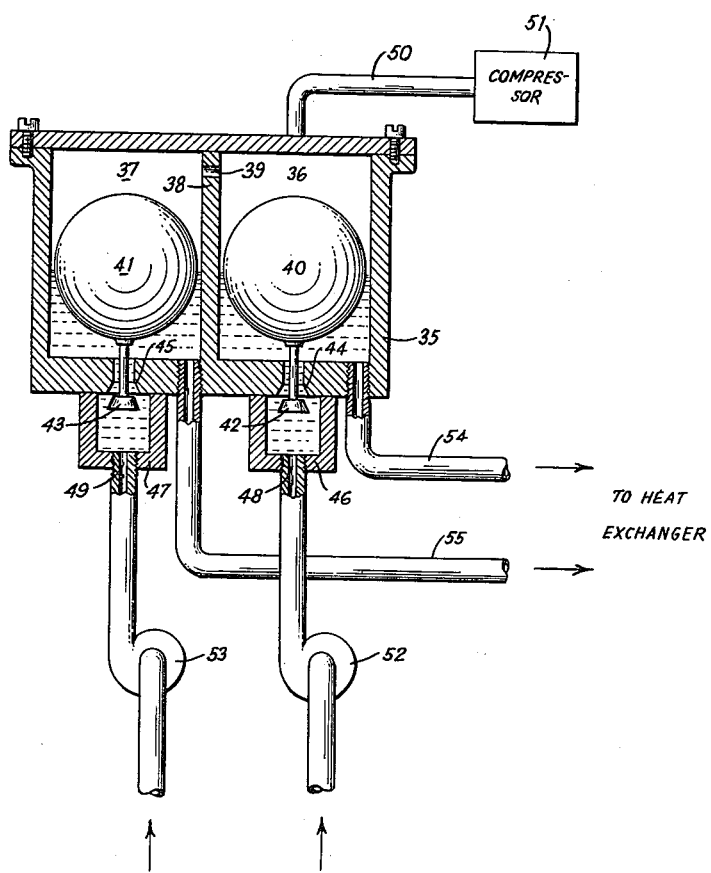
FIGURE 4 is a side view, partly in section of a representative pressure control unit for use in the apparatus of FIGURE 1.

The pressure control unit 13 is shown in greater detail in FIGURE 4. It comprises a housing 35 subdivided into compartments 36 and 37 by a partitioning wall 38 having a vent passage 39 therethrough. Floats 40 and 41 carry valve stems 42 and 43 fitting in valve seats 44 and 45, respectively. The valves are enclosed in valve housings 46 and 47 having inlet passages 48 and 49.

A pressure duct 50 from a suitable source of pressure, for example, a source of compressed air 51 admits air of a predetermined controlled pressure to the chambers 36 and 37. Equal pressure exists in both chambers by reason of the equalizing passage 39.

Unless there is liquid in the chambers 36 and 37, the floats 40 and 41 cause the valves 42 and 43 to move into a low position in which the valves admit liquid through the inlet passages 48 and 49. Such liquid may be supplied under the pressure by suitable feeder pumps 52 and 53. These pumps are capable of producing a higher pressure than the pressure normally maintained in the chambers 36 and 37.

As liquid is being fed into the chambers 36 and 37 the floats 40 and 41 rise until the supply is cut off when the liquid has reached a certain level in the chambers. Liquid is withdrawn from the chambers through withdrawal ducts 54 and 55. Such withdrawal tends to reduce the liquid level in the respective chambers and is counteracted by the operation of the valves 42 and 43. The float valves automatically maintain a predetermined level in the chambers 36 and 37 and the liquid leaving through the withdrawal ducts is under a predetermined controlled pressure equal to the air pressure supplied through pressure duct 50.

A predetermined temperature is maintained in the chamber 32 of the heat exchanger 12 by one or several thermostatically controlled valves. Valves 15 control the flow of liquid through bypass ducts 56 and 57.

Figure 2:
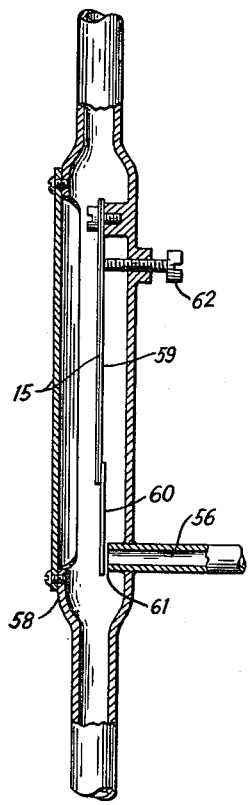
FIGURE 2 is a side view, partly in section, of a temperature control element of the apparatus of FIGURE 1.

FIGURE 2 shows the construction and operation of valves 15 in greater detail. A valve housing 58 encloses a bi-metallic element 59 fitted with a valve member 60 opposite a valve seat 61 for controlling the flow of liquid from, or into, the bypass duct 56. A set screw 62 permits pre-setting of the temperature responsive elements 59 to open and close the valve at predetermined temperatures. It is quite apparent that the valve may be arranged to open at a low temperature and to close at a higher temperature or that the valve may be arranged to close at a low temperature and to open at a high temperature, the operation of the valve being dependent on the direction in which the bi-metallic element flexes upon an increase in temperature. Reverse mounting of the bi-metal element reverses the action of the valve.

The valve units 15 shown in FIGURE 1 are so arranged that the valves 60, 61 open upon an increase in temperature above a pre-set level and that they close when the temperature drops below a pre-set level.

Figure 3:
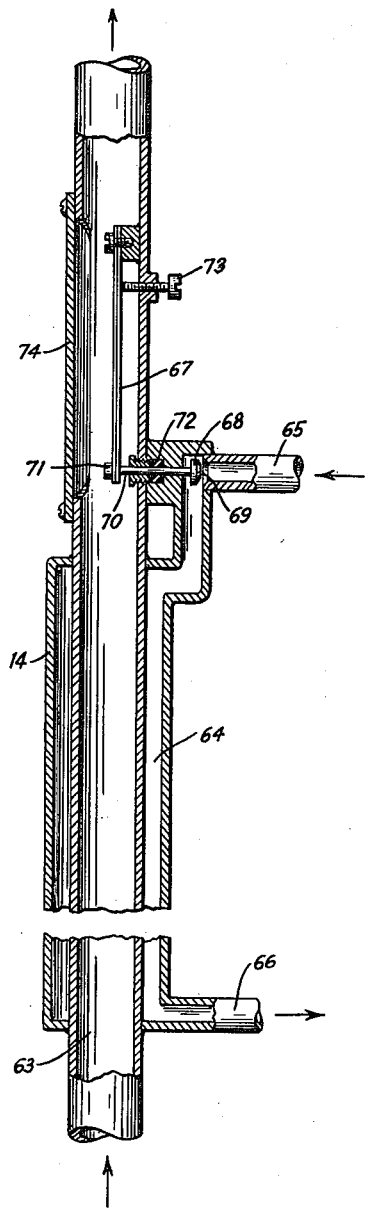
FIGURE 3 is a side view, partly in section, of another temperature control element of the apparatus of FIGURE 1.

The control units 14 are shown in greater detail in FIGURE 3 and constitute, in effect, a thermostatically controlled heat exchanger for heating or cooling the liquid passing through the ducts in which they are installed.

Referring to FIGURE 3, the unit comprises an inner liquid duct 63 for treated liquid or liquid to be treated. The liquid duct 63 is enclosed in an outer jacket 64 having an inlet 65 and an outlet 66. A thermostatically controlled valve controls the amount of fluid passing through the jacket 64. If this fluid is of a higher temperature than the liquid passing through the duct 63, the unit acts as a heater. Steam may be conducted through the jacket 64 for this purpose. If, on the other hand, the fluid passing through the jacket 64 is cooler than the liquid passing through the duct 63 the device operates as a cooling device for the liquid flowing through duct 63.

The valve arrangement is similar to the one described in FIGURE 2 and comprises a bi-metal element 67 for moving a valve member 68 in relation to a valve seat 69. The valve stem 70 is attached to the bi-metal element 71 and passes through a seal 72 in the housing. A set screw 73 permits pre-setting of the bi-metal element to a predetermined temperature.

If the unit operates as a cooling unit the valve 68, 69 opens at a high temperature and closes at a lower temperature. If the unit is operated as a heating unit the valve opens at a low temperature and closes at a higher temperature. Conversion of the unit from heating to cooling is readily effected by reversing the bi-metal element 67. For this purpose the bi-metal element is accessible through a cover plate 74.

The operation of the apparatus of FIGURE 1 is now readily understood.

Raw liquid to be treated, for example, brackish water or sea water to be desalted, is supplied through a raw liquid duct 75 which includes a pump 53 for the purpose of raising the pressure of the liquid before the raw liquid enters the pressure control unit 13.

From the pressure control unit 13 the raw liquid reaches the heat exchanger 12 through a duct 76 and flows through the chamber 32 to leave the heat exchanger at 34. It then passes through the temperature control unit 15 whose bypass valve closes the bypass duct 57 unless the temperature of the raw liquid passing through the unit 15 is in excess of the normal operating temperature. The raw liquid then passes through the temperature control unit 14 which at the beginning of operation functions as a heater to preheat the raw liquid before it enters the electrodialysis unit 11. The preheated raw liquid then reaches the deionization compartments 23 through branch 77 and manifold 26 and also reaches the concentration compartments 24 through branch 78 and manifold 27. The liquid flows through the concentration compartments in counterflow with respect to the direction of flow in the deionization compartments, and deionized liquid leaves the electrodialysis unit through manifold 25 and duct 79. This duct passes through the heat exchanger 12 to withdraw heat from the treated liquid for reuse of the withdrawn heat for preheating raw liquid about to be treated. Similarly, ionic concentrate leaves the electrodialysis unit through manifold 28 and duct 80 which likewise passes through the heat exchanger to withdraw heat energy therefrom.

Electrolyte is supplied through an electrolyte supply duct 81 including a pump 52 to raise the pressure of the electrolyte prior to entry into the pressure control unit 13. From the pressure control unit the electrolyte flows through a further duct 82 to the heat exchanger and enters the electrode chamber 22 of the electrodialysis unit. Thence the electrolyte flows through the connecting duct 29, the second electrode chamber 21 to an outflow duct 83 which passes through the heat exchanger 12. The three outlet ducts 79, 80 and 83 may be fitted with shut-off valves 84.

As the various flows of liquid pass through the electrodialysis unit, the temperature of the liquid is increased by a certain margin which may be of the order of several degrees centigrade. The major portion of this heat is developed in the membranes which, because of their relatively high electrical resistivity, act like heaters. The heat generated in the membranes is dissipated into the liquid flowing past the membranes, but the cooling effect of the liquid on the membranes is limited due to the fact that the liquid is not cold but preheated. Controlled cooling prevents overheating of the membranes and formation of vapor. This heat energy generated in the apparatus is in excess of the heat losses of a properly constructed installation and is therefore sufficient to supply all the heat required for continuous operation at an elevated temperature, after an initial warming-up period during which supplemental heat is supplied.

Excess heat may be dissipated by permitting a certain portion of the treated liquid to leave the apparatus without extraction of heat therefrom by the heat exchanger. More particularly, passage of deionized liquid through the bypass duct 56 causes the temperature of the heat exchanger to be reduced.

Excess heat may also be extracted for use outside of the installation. This is readily accomplished by means of the temperature control unit 14 in the duct 79. This unit 14 withdraws heat from the dilute. The surplus heat is then carried off by liquid circulating through ducts 65 and 66.

The temperature of the heat exchanger may also be reduced indirectly by admitting a certain volume of raw liquid through the bypass duct 57. This volume of liquid is not preheated and causes the temperature of the raw liquid entering the electrodialysis unit to drop. The temperature of the dilute, as well as the temperature of the concentrate, is then reduced correspondingly.

It is thus seen that one or several temperature control units may be omitted in an actual installation. They are shown in FIGURE 1 for the sake of completeness and were installed in an experimental unit for the purpose of tests.

Figure 5:
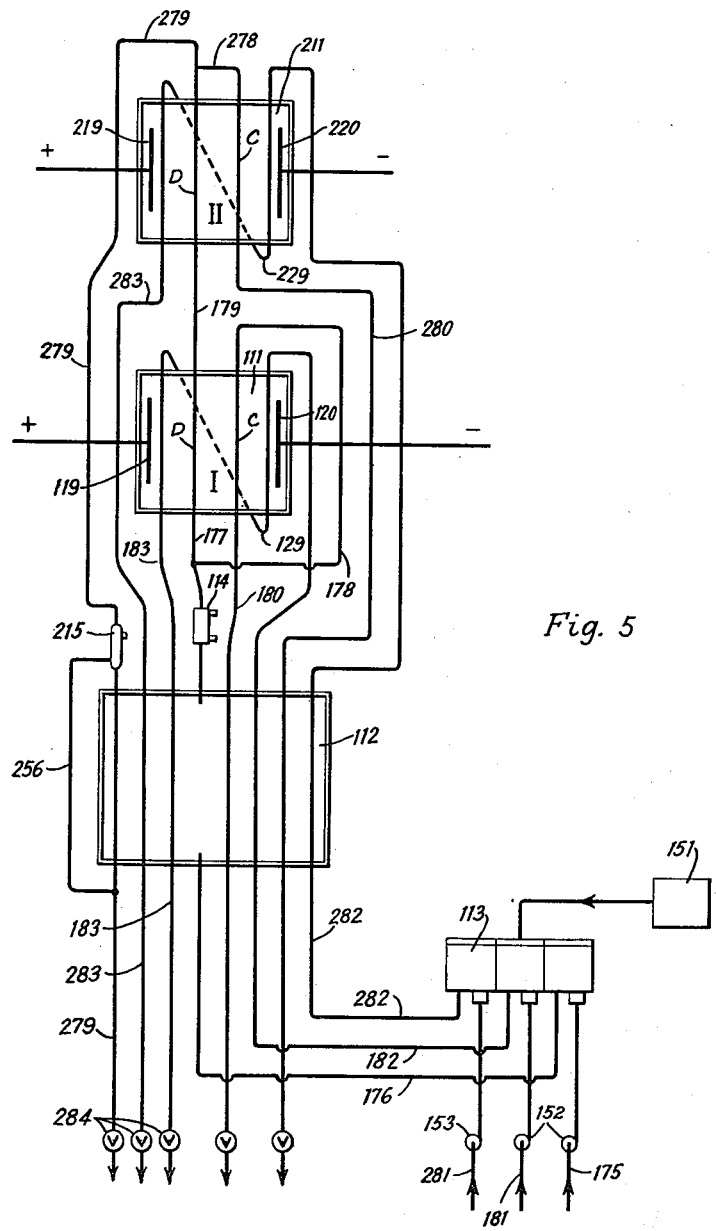
FIGURE 5 is a schematic view of a multi-stage apparatus for practicing the invention, the apparatus comprising structural elements shown in FIGURES 1 to 4.

FIGURE 5 is a diagrammatic representation of a two-stage apparatus embodying the invention. In identifying the various components, reference numerals are used differing from the previously used reference numerals by 100, as applied to the first stage, and by 200, as applied to the second stage.

A common heat exchanger 112 serves the electrodialysis unit 111 constituting the first stage, and the electrodialysis unit 211 constituting the second stage.

Raw liquid to be deionized, for example, brackish water or sea water, is supplied through a duct 175 leading to a pressure control unit 113 via a pump 152. The pressure control unit maintains a constant pressure which is determined by the air or gas pressure supplied by the source 151. The raw liquid then flows through duct 176 to the heat exchanger 112 and a pre-heater 114 which is used to supply additional heat at the start of the operation. The raw fluid is then divided into two branches, one branch flowing through duct 178 leading to the concentration compartments C of the first unit from which a concentrate discharge duct 180 extends. The second branch 177 supplies the deionization compartments, and the treated liquid passes through duct 179 to the second stage where it enters the deionization compartment for further deionization. Deionized liquid of great purity is discharged through duct 279 which passes through the heat exchanger 112 for extraction of most of its heat energy. For the purpose of temperature regulation a thermostat 215 is provided which controls a bypass duct 256.

A certain volumetric portion of the dilute produced by the second stage is fed into the concentration compartments of the second stage by duct 278. The resulting concentrate is discharged through duct 280.

Certain aspects of the counterflow arrangement as well as the practice of using ionic dilute as liquid supply for the concentration compartment forms the subject matter of my prior application Serial No. 175,126, filing date July 21, 1950, now abandoned, and continuation-in-part application Serial No. 672,311, filing date July 16, 1957.

Electrolyte is supplied to the first stage through ducts 181 and 182 and passes from one electrode compartment to the other through duct 129. The influent of the electrode compartment is discharged through duct 183.

Similarly, electrolyte is supplied to the second stage through ducts 281, 282 and passes from one electrode chamber to the other through duct 229. The influent is discharged through duct 283.

The advantages of the invention are illustrated by the following tests.

A. *Tests Conducted With Membrane Type Deionizer*

The electrodialysis unit of the first stage was equipped with 100 membranes composed of Amberlite IR–120 and IRA–400, respectively, bonded with polyethylene binder rendered infusible by X-ray radiation as hereinbefore described. The anion membranes and cation membranes were arranged in alternating sequence. Each membrane measured 100 mm. by 400 mm., the thickness being 1 mm. The spacing of the membrane was 1 mm. The electrode chambers were fitted with platinum electrodes.

The described arrangement resulted in 50 concentration chambers, 49 deionization chambers and 2 electrode chambers as follows: anode chamber, concentration chamber, dilution chamber, concentration chamber . . . dilution chamber, concentration chamber, and cathode chamber. All deionization chambers and all concentration chambers were manifolded as shown specifically in FIGURE 1.

The electrodialysis unit of the second stage was of similar construction as the unit of the first stage with the following exceptions: The membranes were spaced 2 mm. apart and the spaces between the membranes were filled with an ion conductive filler according to my prior Patent No. 2,815,320, dated December 3, 1957, composed of a mixture of equal quantities, by weight, of beads of Dowex 1 and Dowex 50.

The heat exchanger consisted of 7 vertical bundles of stainless steel tubes of 3 mm. outside diameter and 0.2 mm. wall thickness and 1000 mm. length. There were 8 tubes in each bundle and the tubes were enclosed in a tubular shell of 25 mm. inside diameter and 1000 mm. length. Each bundle of tubes was manifolded at both ends and the respective ducts connected to the manifolds.

The raw fluid inlet duct 176 was equipped with an electric heater instead of the illustrated heat exchange-type heater 114. The entire apparatus was tested for liquid tightness at 100 pounds per square inch hydraulic pressure and all ducts were thermally insulated by rock wool placed around them. Cold sea water of approximately 65° F. was supplied as raw fluid as well as electrolyte for both stages. The raw water contained 35 mg. of salts per cc. The various outflow rates were adjusted as follows:

| | Cc. per second |
|---|---|
| Dilute (279) | 1 |
| Concentrate—stage 1 (180) | 2 |
| Concentrate—stage 2 (280) | 0.5 |
| Electrolytes—stage 1 (183) | 1 |
| Electrolytes—stage 2 (283) | 1 |

*Test I.*—The thermostat was adjusted to maintain a temperature of 70° C. and the voltage was adjusted to produce a current of 2.5 amps. in stage 1 and a current of 1.0 amp. in stage 2.

The operation was started by energizing the electric heater until the thermostat of unit 215 began to open the bypass valve. The electric heater was then de-energized and the apparatus maintained the set temperature of 70° thereafter by pre-heating of the influents by means of the heat extracted from the effluents. An equilibrium condition was reached approximately 30 minutes after de-energizing of the auxiliary heater 114 at which time the potential applied to stage 1 remained substantially constant at 22.6 volts and the potential applied to stage 2 remained substantially constant at 27.3 volts. The dilute outflow (279) contained 0.12 mg. of salt per cc. The average temperature increase of the liquids by reason of passage through the electrodialysis units was 2.7 degrees at unit 111 and 2.4 degrees at unit 211.

*Test II.*—For the second test the thermostat was set at 110° C. and the liquids were maintained under a pressure of 30 pounds per square inch. The dilute outflow (279) contained 0.22 mg. of salt per cc. The potential applied to stage 1 was substantially constant at 18.1 volts and the potential applied to stage 2 was substantially constant at 22.9 volts.

*Test III.*—Test II was repeated after removal of the heat exchanger, but the thermal insulation of the apparatus was not removed. During this test a potential of 44.7 volts had to be applied to stage 1 and 56.5 volts had to be applied to stage 2 in order to maintain the currents of 2.5 and 1.0 amp., respectively. The dilute (279) contained 0.09 mg. of salt per cubic cc.

*Comparison of economies.*—In order to compute the economies of the various operations the amount of salt removed by the operation was divided by the wattage consumed.

Test I (70° C.):

$$\frac{35 \text{ mg.} - 0.12 \text{ mg.}}{22.6 \text{ v.} \times 2.5 \text{ amp.} + 27.3 \text{ v.} \times 1 \text{ amp.}} = \frac{34.88 \text{ mg.}}{56.5 \text{ va.} + 27.3}$$

= 0.416 mg. of salt removed per watt sec.

Test II (110° C.):

$$\frac{35 \text{ mg.} - 0.22 \text{ mg.}}{18.1 \text{ v.} \times 2.5 \text{ amp.} + 22.9 \text{ v.} \times 1 \text{ amp.}} = \frac{34.78 \text{ mg.}}{45.25 + 22.9}$$

= 0.51 mg. of salt removed per watt sec.

Test III (cold operation):

$$\frac{35 \text{ mg.} - 0.09 \text{ mg.}}{44.7 \text{ v.} \times 2.5 \text{ a.} + 56.5 \text{ v.} \times 1 \text{ a.}} = \frac{34.91 \text{ mg.}}{111.75 + 56.5}$$

= 0.207 mg. of salt removed per watt sec.

B. *Tests Conducted With Membrane-Type Fractionator*

The invention was further tested in its application to an apparatus for fractionating ionic liquids. The fractionating apparatus employed was constructed basically as disclosed in my co-pending application Serial No. 445,309, filed July 23, 1954, now Patent No. 2,854,393, dated September 30, 1958, and comprised an electrodialysis unit equipped with 100 membranes composed of Amberlite IR–120 bonded with polyethylene binder and subsequently irradiated by X-rays as hereinbefore disclosed.

The membrane measured 400 mm. in length, 100 mm. in height and 1 mm. in thickness, the spacing between the membranes being 1 mm. 99 treatment chambers were thus formed, flanked by electrode chambers at both ends. The electrodes were made of platinum and the electrode chambers had individual inlet and outlet ducts. The treatment chambers were manifolded at one side into a common inflow duct, the height of the inflow being approximately 50 mm. above the bottom. At the opposite side two manifolds were provided, one at the top of the treatment chambers and another manifold communicating with the bottom of the treatment chambers. The top manifold led to a top outlet duct and the bottom manifold led to a bottom outlet duct.

The heat exchanger was constructed of three bundles of stainless steel tubes of 3 mm. internal diameter and 0.2 mm. wall thickness. There were four tubes in each bundle, manifolded together at both ends and the three bundles were arranged within a vertical tubular shell having an internal diameter of 20 mm. The shell and the tubes were made of stainless steel and measured approximately 1000 mm. in length or, because of the vertical placement, 1000 mm. in height.

All raw liquid was supplied through an inlet at the bottom of the shell to flow in an upward direction. Thence the raw liquid was conducted to the inlet manifold of the fractionator. Hot dilute was conducted from the top manifold through one bundle of tubes downwardly through the heat exchanger. Similarly, hot concentrate was conducted from the bottom manifold through a second bundle of tubes.

A branch duct was provided to supply hot raw liquid upwardly through the cathode chamber, then upwards through the anode chamber and thence downwards through the third bundle of tubes of the heat exchanger.

Temperature control was provided by a thermostatically controlled bypass for raw liquid past the heat exchanger as previously described. The fractionator, the heat exchanger, and the connecting ducts were insulated by rock wool. No supplemental heat was supplied at the start of operation.

For the tests the flows were adjusted as follows:

|  | Cc. per second |
|---|---|
| Top outflow (dilute) | 1 |
| Bottom outflow (concentrate) | 1 |
| Electrode chambers outflow | 1 |

The voltage was adjusted to maintain a current of 3.0 amps.

*Test I—Operation at 80° C.*—The thermostat was set to keep the bypass valve closed at temperatures below 80° C. and to open above 80° C. to admit bypassed cold raw liquid. Raw sea water was used as raw liquid containing 35 mg. of salt per cc.

After an equilibrium condition was reached, which occurred approximately two hours after the start of the operation, the voltage applied to the fractionator unit was 23.9 volts, and remained substantially constant. The ionic dilute contained 9.2 mg. of salts and the concentrate contained 60.8 mg. of salts. The concentrate had a much higher ratio of K ions to total ions contained than the dilute; therefore a substantial degree of ion fractionation was produced.

*Test II—Operation at 110° C.*—In order to maintain an operating temperature of 110° C. the apparatus was operated under a pressure of 30 pounds per square inch with the following results:

| Voltage required | 19.8 volts. |
|---|---|
| Dilute outflow | 10.3 mg. of salts. |
| Concentrate outflow | 59.7 mg. of salts. |

*Test III.*—The apparatus was operated after removal of the heat exchanger. The raw fluid was supplied at a temperature of 20° C. The voltage was 54.3 volts. The dilute contained 8.1 mg. of salts and the concentrate contained 61.9 mg. of salts.

COMPARISON OF ECONOMIES

Test I (80° C.):

$$\frac{35 \text{ mg.} - 9.2 \text{ mg.}}{23.9 \text{ v.} \times 3 \text{ a.}}$$

= 0.36 mg. of salts removed per watt second

Test II (110° C.):

$$\frac{35 \text{ mg.} - 10.3 \text{ mg.}}{19.8 \text{ v.} \times 3.0 \text{ a.}}$$

= 0.415 mg. of salts removed per watt second

Test III (20° C.):

$$\frac{35 \text{ mg.} - 8.1 \text{ mg.}}{54.3 \text{ v.} \times 3 \text{ a.}}$$

= 0.165 mg. of salts removed per watt second

An analysis of the concentrate and of the dilute showed that the K ions and the other highly conductive ions of sea water were almost completely transferred into the concentrate. The dilute contained primarily the weakly conducted ions of sea water such as Na and only traces of K ions. The apparatus therefore operated not only as a fractionator but also as a demineralizer or purifier.

TEMPERATURE TESTS

Tests were conducted to determine the changes in the total electrical resistance of an apparatus as a result of changes in the temperature of the liquid passing therethrough.

For this purpose the fractionator cell was operated at different temperatures of the inflowing liquid and the potential applied to the electrodes was varied so as to maintain the current constant at 3 amps. The results were as follows:

| Temperature, ° C | 20 | 80 | 90 | 93 | 95 | 98 |
|---|---|---|---|---|---|---|
| Voltage | 54.3 | 23.9 | 22.2 | 21.6 | 21.8 | 23.9 |

The results show a progressive reduction in the total resistance of the apparatus with increasing temperature up to an optimum point (93° C.) beyond which a reversal of the characteristic is experienced and the resistance begins to increase again.

The reversal point lies below, but close to, the boiling point of the liquid.

It is known that the electrical resistivity of liquid electrolytes decreases up to the boiling point of the liquid. It must therefore be concluded that the reversal in the characteristic is due to the behavior of the ion exchange material, rather than the liquid. The reversal may be caused by a development of vapor within the ion exchange material. I offer this explanation merely as an explanation arrived at by deduction, rather than specific observation, and its correctness has no bearing on the merit of the observation of the phenomenon of reversal itself.

A second test was conducted by operating the first stage of the dionizer at different temperatures of the inflowing liquid. The current was maintained constant at 2.5 amps. by adjusting the potential accordingly. The results were as follows:

| Temperature, ° C | 20 | 80 | 90 | 93 | 95 | 97 |
|---|---|---|---|---|---|---|
| Potential | 44.7 | 21.4 | 20.3 | 19.8 | 20.1 | 24.2 |

The optimum temperature was again 93° C. and an increase beyond the optimum again brought about a reversal of the characteristic.

In order to compare the resistance of the electrolyte with the resistance of the membranes, the fractionator was subjected to tests as follows:

The membranes were removed, leaving a chamber having a cross section of 400 by 100 mm. with terminal electrodes spaced 101 mm. apart. The cell was filled with sea water containing 35 mg. of salts per cc. The resistance of the apparatus was measured by passing alternating current of 60 cycles through the apparatus. At 20° C. the resistance was 0.44 ohm; at 60° C. the resistance was 0.21 ohm.

The membranes were then reinserted, the cell was filled with sea water, as before, and the resistance was measured. At 20° C. the resistance was 15.4 ohms; at 60° C. the resistance was 7.8 ohms.

From the two tests the total membrane resistance was computed by deducting the resistance of the electrolyte from the total resistance of the apparatus, giving a total membrane resistance of 14.96 ohms at 22° C., and 7.59 ohms at 60° C. The figures show that the resistance of the electrolyte is an insignificant portion of the total electrical resistance of the cell, the resistance of the liquid being of the order of less than 3% of the total.

The electrical energy transformed into heat is substantially proportional to the resistance of the components of the cell. It therefore appears that the heat development takes place in the membranes and only an insignificant fraction of the total is developed in the body of the liquid.

In order to corroborate the above findings, the first stage of the deionizer was filled with sea water containing 35 mg. of salts per cc. The resistance was measured by passing alternating current of 60 cycles through the apparatus. At 20° C. the total resistance was 15.7 ohms and at 60° C. the total resistance was 8.20 ohms. The sea water resistance had previously been determined as being 0.44 ohm at 20° C. and 0.21 ohm at 60° C. by a test conducted in the housing of the fractionator having the same dimensions. The total membrane resistance was then computed by deducting the resistance of the sea water from that of the apparatus.

Ohms
Resistance at 20° C. _____ 15.26
Resistance at 60° C. _____ 7.99

The resistivity of the membranes, computing an average figure for the anion and cation membranes, is as follows.

I. Deionizer:

At 20° C. $\quad \frac{15.26 \times 40 \times 10}{0.1 \times 100} = 610.4\Omega$ At 60° C. $\quad \frac{7.99 \times 40 \times 10}{0.1 \times 100} = 319.6\Omega$ II. Fractionator:

At 20° C. $\quad \frac{14.96 \times 40 \times 10}{0.1 \times 100} = 598.4\Omega$ At 60° C. $\quad \frac{7.59 \times 40 \times 10}{0.1 \times 100} = 303.6\Omega$ Commercially available membranes known to the trade as Amberplex C–1 and Amberplex A–1 have a resistivity of 2308 ohms and 2448 ohms, respectively, as reported in the paper entitled "Electrodialysis of Water Using a Multiple Membrane Cell," by A. Winger, G. Bodamer, R. Kunin, C. Prizer and G. Harmon, presented at the Kansas City meeting of the American Chemical Society in 1954.

Ion exchange materials used in practicing the invention should have an ionic concentration in the pores greater than the ionic concentration of the liquids being treated and the advantages of the invention are obtained in any apparatus in which more heat is developed in the structure of ion exchange material than in the liquid to be treated.

Such ion exchange materials may be resins or may be natural or synthetic minerals having ionic concentrations ranging between 0.5 N to 6 N. Examples of such materials are Dowex 1, Dowex 51, Amberlites IR–120, IRA–400, alumino-silicates, glauconite, fuller's earth, etc.

Such materials were subjected to tests in a chamber measuring 50 mm. in width, 50 mm. in height, and 100 mm. in length with platinum electrodes at both ends. The chamber was filled with particles of the various ion exchange materials and readings were taken at 20° C. and 60° C.

The materials were equilibrated in aqueous KCl solution of 2000 ohms resistivity, measured by a conductivity bridge. The tests were conducted under two conditions, the filler being submerged in KCl solution and, thereafter, after draining of the solution leaving the ion exchange material in a wetted but drained state.

The resistance of the body of ion exchange material was measured by passing alternating currents of 60 cycles through the apparatus.

| Cell filled with— | (Resistance in Ohms) | | | |
|---|---|---|---|---|
| | Solution filled | | Drained | |
| | 20° C. | 60° C. | 20° C. | 60° C. |
| IR-120 beads | 32 | 16 | 42 | 24 |
| IRA-400 | 46 | 25 | 58 | 32 |
| Dowex 1 beads | 44 | 24 | 55 | 30 |
| Dowex 50 beads | 32 | 17 | 40 | 22 |
| Dowex 50 and Dowex 1 mixed in equal proportions | 39 | 20 | 48 | 26 |
| Fuller's Earth granules, 1 mm. diameter | | | 800 | 520 |
| Solution only | 830 | 420 | | |

The table shows that the electrical resistance of the ion exchange materials decreases materially with an increase in temperature. It shows further that the current through the liquid filled compartment is carried predominantly by the ion exchange material and only to a small extent by the liquid itself as shown by the relatively small decrease in resistance obtainable by filling the compartment with excess liquid. The resistance of the liquid itself is relatively high as indicated by the figures representing the liquid filled compartment without any ion exchange material.

This application is a continuation-in-part of application Serial No. 585,536, filed May 17, 1956, now abandoned.

What is claimed is:

1. In the method of electrodialytically treating an ionic liquid by subjecting the liquid to electrodialysis in a first stage and then in a further stage of an apparatus comprising, in both stages, a plurality of alternating concentration compartments and dilution compartments between electrodes for passing a direct electric current through the compartments, the compartments being separated by membranes of ion exchange material, past which membranes the liquid flows and withdraws heat generated in said membranes by the electric current, the steps of, preheating the influent liquid of the first stage in a heat exchanger; withdrawing heat from the concentrate effluent of the first stage in said exchanger; passing the dilute effluent of the first stage through the diluting compartments of said further stage substantially without removal of heat from the dilute effluent of said first stage prior to its introduction into said further stage; and reintroducing a portion of the dilute effluent of said further stage into said further stage as a concentrate influent, so as to maintain the dilute influent of the further stage at a higher temperature than the dilute influent of the first stage and to maintain the concentrate influent of said further stage at a still higher temperature than the dilute influent of said further stage.

2. In the method of electrodialytically treating an ionic liquid by subjecting the liquid to electrodialysis in a first stage and then in a further stage of an apparatus comprising, in both stages, a plurality of alternating concentration compartments and dilution compartments between electrodes for passing a direct electric current through the compartments, the compartments being separated by permselective membranes of ion exchange material, past which membranes the liquid flows and withdraws heat generated in said membranes by the electric current, the steps of, preheating the influent liquid of the first stage in a heat exchanger; withdrawing heat from the concentrate effluent of the first stage in said exchanger; passing the dilute effluent of the first stage through the diluting compartments of said further stage substantially without removal of heat from the dilute effluent of said first stage prior to its introduction into said further stage; and reintroducing a portion of the dilute effluent of said further stage into said further stage as a concentrate influent, so as to maintain the dilute influent of the further stage at a higher temperature than the dilute influent of the first stage and to maintain the concentrate influent of said further stage at a still higher temperature than the dilute influent of said further stage and passing the effluents of said further stage through said heat exchanger to recover heat therefrom for preheating the influent liquid of the first stage.

3. In the method of electrodialytically treating an ionic liquid by subjecting the liquid to electrodialysis in a first stage and then in a further stage of an apparatus comprising, in both stages, a plurality of alternating concentration compartments and dilution compartments between electrodes for passing a direct electric current through the compartments, the compartments being separated by permselective membranes of ion exchange material, past which membranes the liquid flows and withdraws heat generated in said membranes by the electric current, the steps of, preheating the influent liquid of the first stage in a heat exchanger; withdrawing heat from the concentrate effluent of the first stage; passing dilute effluent of the first stage through the dilution compartments of the further stage and passing a portion of the total volume of the dilute effluent of the first stage through the concentrating compartments of the further stage substantially without removal of heat from said dilute effluent, so as to maintain the further stage at a higher temperature than the first stage; and passing the effluents of said further stage through said heat exchanger to recover heat therefrom for preheating the influent liquid of the first stage.

4. In the method of electrodialytically treating an ionic liquid by subjecting the liquid to electrodialysis in successive stages in a system in which each stage comprises a plurality of alternating concentration compartments and dilution compartments between electrodes for passing a direct electric current through the compartments, the compartments being separated by permselective membranes of ion exchange material past which membranes the liquid flows and withdraws heat generated in said membranes by the electric current, the steps of, passing liquid by flow past opposite sides of the membranes separating the concentration compartments from the dilution compartments; preheating the influent liquid of an initial stage by heat impartation as hereinafter set forth; withdrawing heat from the concentrate effluent of the initial stage and imparting such withdrawn heat to initial stage influent; passing dilute effluent of the initial stage through the diluting compartments of an advanced stage substantially without removal of heat from the dilute effluent of the initial stage prior to its introduction into said advanced stage, so as to maintain the dilute influent of the advanced stage at a higher temperature than the dilute influent of the initial stage; withdrawing heat from effluent of an advanced stage; and imparting heat withdrawn from advanced stage effluent to initial stage influent.

5. In the method of electrodialytically treating an ionic liquid by subjecting the liquid to electrodialysis in successive stages in a system in which each stage comprises a plurality of alternating concentration compartments and dilution compartments between electrodes for passing a direct electric current through the compartments, the compartments being separated by permselective membranes of ion exchange material past which membranes the liquid flows and withdraws heat generated in said membranes by the electric current, the steps of, preheating the influent liquid of an initial stage by heat impartation as hereinafter set forth; withdrawing heat from the concentrate effluent of the initial stage and imparting such withdrawn heat to initial stage influent; passing dilute effluent of the initial stage through the diluting compartments of an advanced stage substantially without removal of heat from the dilute effluent of the initial stage prior to its introduction into said advanced stage, so as to maintain the dilute influent of the advanced stage at a higher temperature than the dilute influent of the initial stage; withdrawing heat from at least a portion of the effluent of the advanced stage; and imparting said last mentioned withdrawn heat to initial stage influent; and reintroducing a portion of the dilute effluent of said advanced stage as advanced stage concentrate influent substantially without removal of heat from said reintroduced portion.

6. In the method of electrodialytically treating an ionic liquid by subjecting the liquid to electrodialysis in successive stages in a system in which each stage comprises a plurality of alternating concentration compartments and dilution compartments between electrodes for passing a direct electric current through the compartments, the compartments being separated by permselective membranes of ion exchange material pass which membranes the liquid flows and withdraws heat generated in said membranes by the electric current, the steps of preheating the influent liquid of an initial stage by heat impartation as hereinafter set forth; withdrawing heat from the concentrate effluent of the initial stage and imparting such withdrawn heat to initial stage influent; dividing the total volume of dilute effluent of the initial stage into two branches within the system; passing dilute effluent of the initial stage through the diluting compartments of an advanced stage substantially without removal of heat from the dilute effluent of the initial stage prior to its introduction into said advanced stage, so as to maintain the dilute influent of the advanced stage at a higher temperature than the dilute influent of the initial stage; passing liquid of one of said branches through the concentration compartments of the advanced stage substantially without withdrawal of heat from said one branch; withdrawing heat from effluent of an advanced stage; and imparting such heat withdrawn from advanced stage effluent to initial stage influent.

References Cited in the file of this patent

UNITED STATES PATENTS

| | | |
|---|---|---|
| 1,023,545 | Bates et al. | Apr. 16, 1912 |
| 2,093,770 | Billiter | Sept. 21, 1937 |
| 2,777,811 | McRae et al. | Jan. 15, 1957 |
| 2,815,320 | Kollsman | Dec. 3, 1957 |
| 2,860,095 | Katz et al. | Nov. 11, 1958 |

OTHER REFERENCES

Winger et al.: "Journal of the Electrochemical Society," vol. 100, No. 4, April 1953, pages 178–184.

"Industrial and Engineering Chemistry," vol. 47, No. 1, pages 50–60, January 1955.